United States Patent [19]
Heine et al.

[11] Patent Number: 6,137,650
[45] Date of Patent: Oct. 24, 2000

[54] SPINDLE MOTOR WITH FLUID DYNAMIC BEARING HAVING A JOURNAL BEARING IN COMBINATION WITH A CONICAL BEARING

[75] Inventors: Gunter Karl Heine, Aptos; Mohamed Mizanur Rahman, San Jose; Raquib Uddin Khan, Pleasanton; Hans Leuthold, Santa Cruz, all of Calif.

[73] Assignee: Seagate Technology L.L.C., Scotts Valley, Calif.

[21] Appl. No.: 08/981,338

[22] PCT Filed: Dec. 19, 1997

[86] PCT No.: PCT/US97/23925

§ 371 Date: Dec. 19, 1997

§ 102(e) Date: Dec. 19, 1997

[87] PCT Pub. No.: WO98/48419

PCT Pub. Date: Oct. 29, 1998

Related U.S. Application Data

[60] Provisional application No. 60/044,100, Apr. 23, 1997.

[51] Int. Cl.$^7$ .................................................. G11B 17/08
[52] U.S. Cl. ..................................... 360/98.07; 360/99.08
[58] Field of Search ............................. 360/98.07, 99.08; 310/90; 384/110

[56] References Cited

U.S. PATENT DOCUMENTS

| | | | |
|---|---|---|---|
| 4,043,612 | 8/1977 | Orcutt | 308/9 |
| 5,246,294 | 9/1993 | Pan | 384/119 |
| 5,283,491 | 2/1994 | Jabbar | 310/90 |
| 5,430,590 | 7/1995 | Ainslie et al. | 360/98.07 |
| 5,448,120 | 9/1995 | Schaule et al. | 310/90 |
| 5,488,521 | 1/1996 | Lemke et al. | 360/97.02 |
| 5,969,448 | 10/1999 | Liu | 310/90 |

*Primary Examiner*—A. J. Heinz
*Attorney, Agent, or Firm*—Flehr Hohbach Test Albritton & Herbert LLP

[57] ABSTRACT

A hydrodynamic fluid bearing useful in a bearing cartridge which cartridge may be incorporated into a spindle motor or the like, where the bearing includes a shaft, a conical bearing supported on the shaft, and journal bearings located at least on one side and typically both above and below the conical bearing. A sleeve is mounted for rotation relative to the shaft and defines, in cooperation with the shaft, the gaps necessary for both the conical hydrodynamic bearing and the axial, journal bearings. At an end of the shaft, capillary seals are defined between the sleeve and the shaft so that fluid does not escape from the hydrodynamic bearing. The shaft itself includes a central hole, with bores communicating with both the conical bearing and the journal bearings to maintain appropriate pressure balances.

In a further desirable feature, in some embodiments the diameter of one end of the shaft can be made greater than the diameter of the other end of the shaft. This allows for making the gaps between the shaft and the surrounding sleeve or journal to be greater where the diameter of the fixed shaft is greater, reducing the need for tight tolerances within at least part of the hydrodynamic bearing. Preferably the top end of the shaft (i.e. the end of the shaft adjacent the wider end of the conical bearing) has the journal bearing with greater diameter.

17 Claims, 5 Drawing Sheets

SPINDLE MOTOR WITH FLUID DYNAMIC BEARING HAVING A JOURNAL BEARING IN COMBINATION WITH A CONICAL BEARING

CROSS-REFERENCE TO RELATED APPLICATION

This application is based on U.S. Provisional Patent Application, Ser. No. 60/044,100 filed Apr. 23, 1997, assigned to the assignee of this application and incorporated herein by reference.

Reference should also be made to U.S. patent application, Ser. No. 08/944,100, filed Dec. 19, 1997; U.S. patent application Ser. No. 09/043,065, filed Dec. 19, 1997 U.S. Pat. No. 6,069,767; and U.S. patent application Ser. No. 08/981,548, filed Dec. 19, 1997; all of which are assigned to the assignee of this invention and are incorporated herein by reference.

FIELD OF THE INVENTION

The present invention relates to magnetic disc drive storage systems, and more specifically, the present invention relates to a hydrodynamic fluid bearing for use in a magnetic disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of a storage disc to rotate relative to a fixed member. However, ball bearing assemblies have many mechanical problems such as wear, dents in balls or raceways, run-out and manufacturing difficulties. Moreover, resistance to operating shock and vibration is poor because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large surface area in comparison with a ball bearing assembly which comprises a series of point interfaces. This is desirable because the increased bearing surface reduces wobble or run-out between the rotating and fixed members. Further, the use of fluid in the interface area imparts damping effects to the bearing which helps to reduce non-repeat runout.

However, hydrodynanic bearings themselves suffer from a number of disadvantages. These disadvantages include a low stiffness-to-power ratio.

SUMMARY OF THE INVENTION

Thus, it is an object of the present invention to create an improved hydrodynamic fluid bearing which is relatively insensitive to shock, vibration, changes in load and rotational speed and is dynamically more stable.

A related objective of the invention is to provide a hydrodynamic bearing open at both ends in which the balance of fluid flow within the bearings is maintained.

Yet another object of the present invention is to provide a hydrodynamic bearing assembly which is more easily assembled, and in which the gaps are easily adjusted.

A further objective of the invention is to provide a hydrodynamic bearing design in which the tolerances for assembly of the various components is minimized; that is, the critical nature of many of the gaps is diminished.

Another objective of the invention is to provide a hydrodynamic bearing useful in a spindle motor or the like which is stiffer than known standard spindle motors which are supported only at one end.

These and other objectives of the invention are achieved by a hydrodynamic fluid bearing useful in a bearing cartridge which cartridge may be incorporated into a spindle motor or the like, where the bearing includes a shaft, a conical bearing supported on the shaft, and journal bearings located at least on one side and typically both above and below the conical bearing. A sleeve is mounted for rotation relative to the shaft and defines, in cooperation with the shaft, the gaps necessary for both the conical hydrodynamic bearing and the axial, journal bearings. At the ends of the shaft, capillary seals are defined between the sleeve and the shaft so that fluid does not escape from the hydrodynamic bearing. The shaft itself includes a central hole, with bores communicating with both the conical bearing and the journal bearings.

In a further desirable feature, in some embodiments the diameter of one end of the shaft can be made greater than the diameter of the other end of the shaft. This allows for making the gaps between the shaft and the surrounding sleeve or journal to be greater where the diameter of the fixed shaft is greater, reducing the need for tight tolerances within at least part of the hydrodynamic bearing. Preferably the top end of the shaft (i.e. the end of the shaft adjacent the wider end of the conical bearing) has the journal bearing with greater diameter.

Further, incorporating the conical bearing allows for the support of both axial and radial loads. This is especially useful in designs such as spindle motors for disc drives, where a number of discs may needed to be supported for rotation, modifying the axial and radial loads which are to be imposed on a given motor.

Yet another advantage of this design is that by making the design stiffer than that of a single plate hydrodynamic bearing, it will enhance the resistance to operating shock and vibration of the bearing.

Yet another feature of this invention is that the assembly of the finished bearing and its surrounding sleeve can be more easily achieved by virtue of the fact that only a single conical bearing with axial journal bearings both above and below the conical bearing are provided.

Other features and advantages of the present invention will become apparent to a person of skill in the art who studies the present invention disclosure given with respect to the following figures.

DETAILED DESCRIPTION OF A PREFERRED EMBODIMENT

Figure 1:
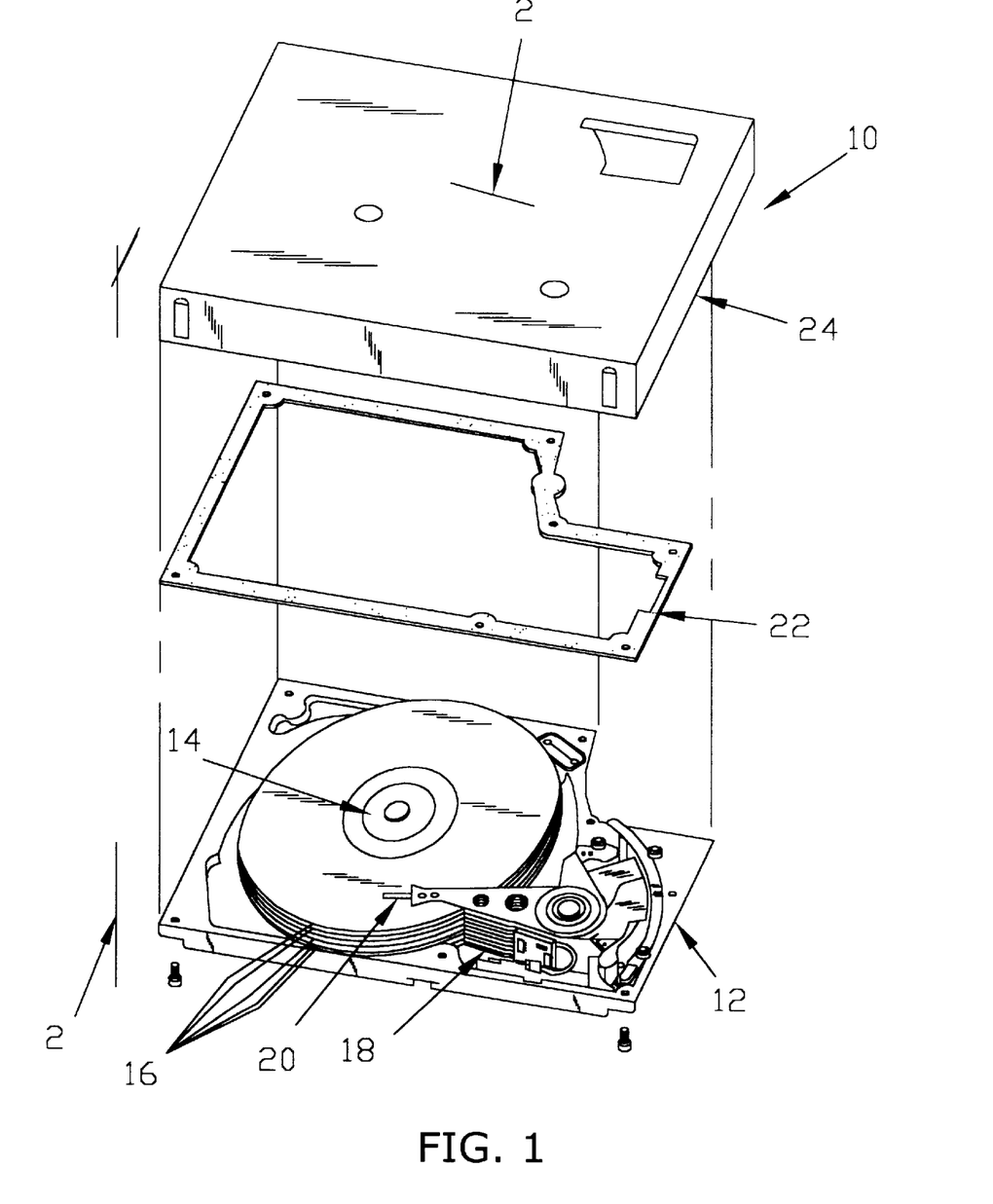
FIG. 1 is a perspective view of a magnetic disc storage system which may incorporate the hydrodynamic bearing cartridge and spindle motor in accordance with the present invention.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing cartridge is not limited to use with this particular design of a disc drive, which is shown only for purposes of the example. Given the many advantages which this invention achieves, it could also potentially be used to support the actuator for rotation. The bearing cartridge also has numerous other uses outside of the field of disc drives.

Figure 3:
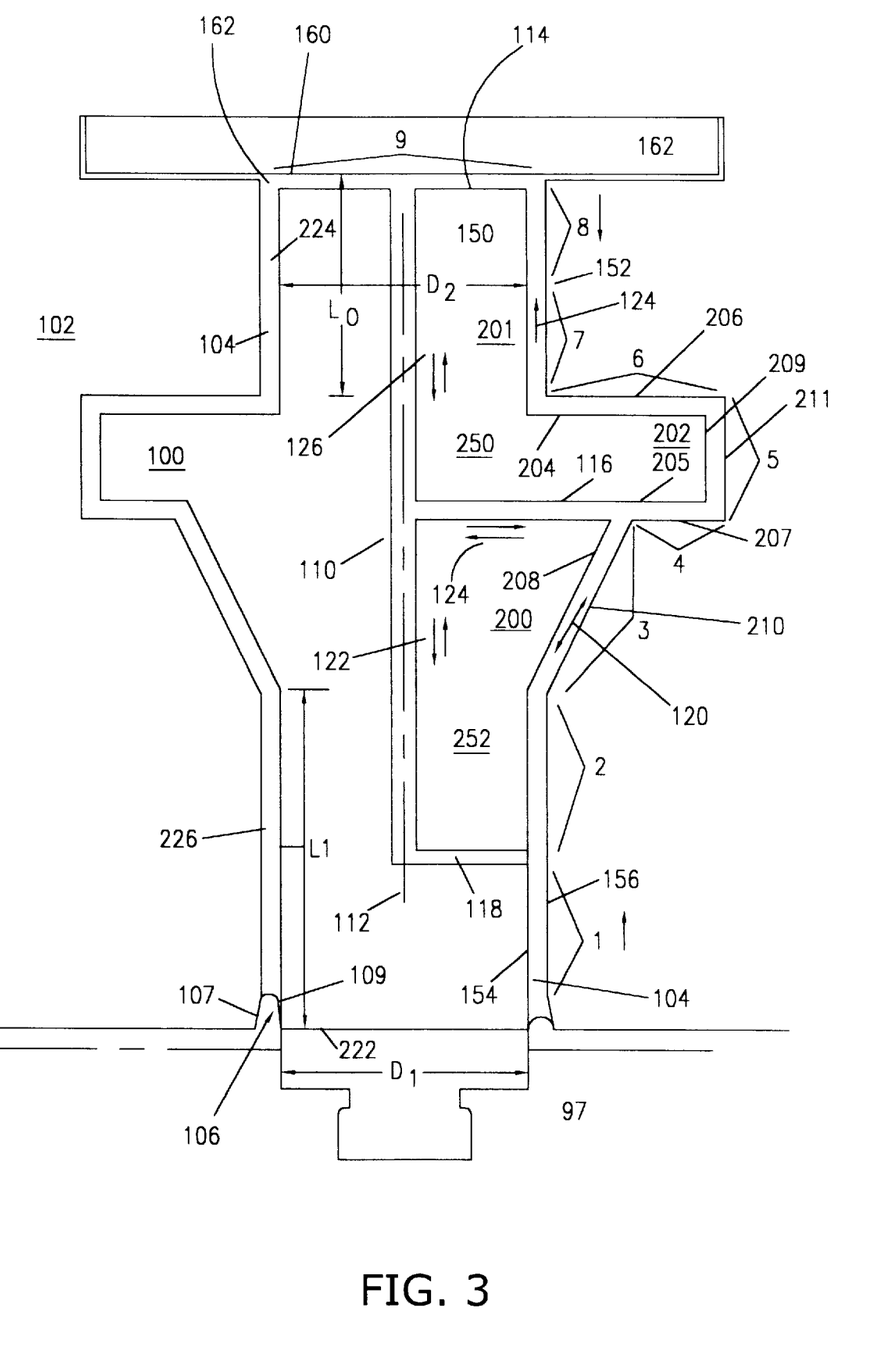
FIG. 3 is a vertical sectional view of a hydrodynamic bearing cartridge in accordance with the present invention incorporated in a spindle motor.

Further, the fluid bearing disclosed herein has a fixed shaft and rotating, surrounding sleeve. The design is also useful where the sleeve is fixed and the shaft rotates, provided it is turned upside-down from what is shown in FIG. 3.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain the transducer flying over the surface of the disc. In present day technology, the spacing distance between the transducer and the rotating disc surface is measured in microns; thus it is absolutely essential that the disc does not tilt or wobble.

Figure 2:
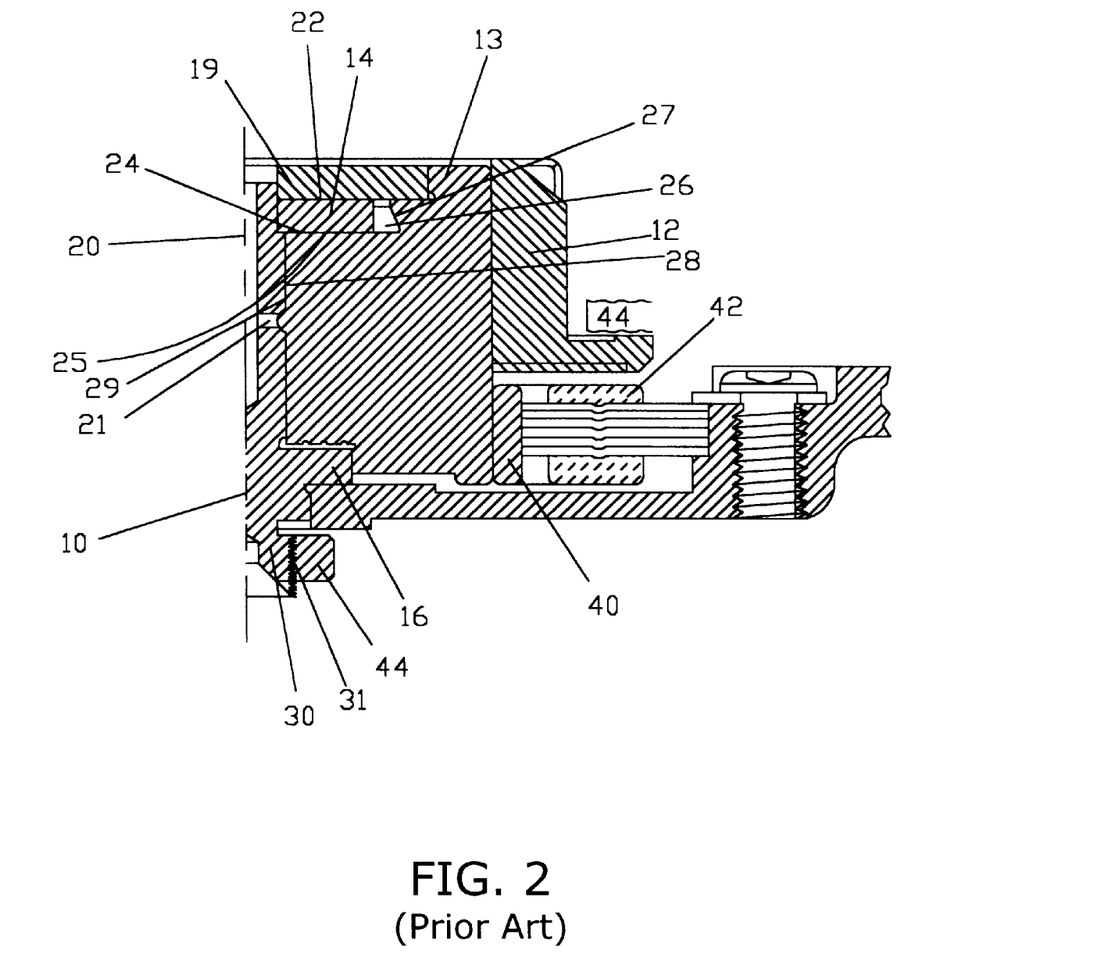
FIG. 2 is a vertical sectional view of a prior art hydrodynamic bearing cartridge incorporated in a spindle motor assembly.

FIG. 2 is a vertical sectional view of a single thrust plate hydrodynamic bearing motor design of a type which is already established in this technology. The basic structure of the motor shown in this figure includes a stationary shaft 10 and a hub 12 supported from a sleeve 13 for rotation around the shaft. The shaft 10 includes a thrust plate 14 at one end, and terminates in a shoulder 16 at the opposite end. The sleeve 13 supports a counterplate 19 at one end, for rotation over the thrust plate 14. The counterplate 19 and thrust plate 14 are separated by a sufficient gap 22 to allow circulation of lubricating fluid to lubricate the hydrodynamic bearing out of the reservoir 20, through the gap 22, through the reservoir 26 defined between the end of the thrust plate 14 and an interior surface 27 of the sleeve 13, and between the lower surface 24 of the thrust plate 14 and an upper surface 25 of the sleeve 13, and between an inner surface 28 of the sleeve and the exterior surface 29 of the fixed shaft. The fluid returns to the reservoir primarily through a central bore 21. In order to promote the flow of fluid over the bearing surfaces which are defined between the thrust plate 14 and the counterplate 19; between the thrust plate 14 and the sleeve 13, and between the shaft 10 and the sleeve 13, typically one of the two opposing surfaces of each such assembly carries sections of grooves as is well known in this technology.

The fluid is supplied to all of the lubricated surfaces from the reservoir 20 to flow over the bearing surfaces and be returned to the reservoir through the bore 21. The remainder of the structure of significance which is used to complete the motor design include shaft extension 30 which ends in threaded region 31 which is threaded into a portion of the base 44. A stator 42 cooperates with magnets 40 which are supported from the sleeve 13, with energization of the stator windings 42 causing rotation of the sleeve 13 and the hub 12 about the stationary shaft.

As used in a disc drive motor, this system supports one or more discs 44 for rotation. Because the transducers and disc drives fly at extremely low heights over the surface of the disc, it is essential that there not be wobble or vibration of the hub and disc as it rotates. Moreover, it is also important that should such wobble occur, that there is no touch down between the surfaces of the thrust plate 14 and the opposing surface of the counterplate 19 and sleeve 13. However, as explained above, in a cantilever type bearing such as shown in FIG. 2, where the load carrying surface which is thrust plate 14 is located far from the center point about which any pivoting would occur in the event of vibration or wobble, there is a much greater chance of a touch down or contact between the facing surfaces, which would result in wear of the surfaces over the long term, with possible sludge formation, an increase in power consumption, reduction in bearing life, and a slow down of the rotational speed of the disc in the short term.

It is for this reason that the design of the following figures has been adopted. By adopting this design, load carrying surfaces, whether thrust or conical bearing type, are located closer to the middle of the overall hydrodynamic bearing system. The pivot point about which any rocking of the bearing may occur also lies close to the middle of the bearing. Because of this, by moving the load carrying surfaces as close as possible to the center of the disc, any wobbling or vibration of the disc would have less chance to cause touchdown at the ends of the bearing.

Figures 4A, 4B:
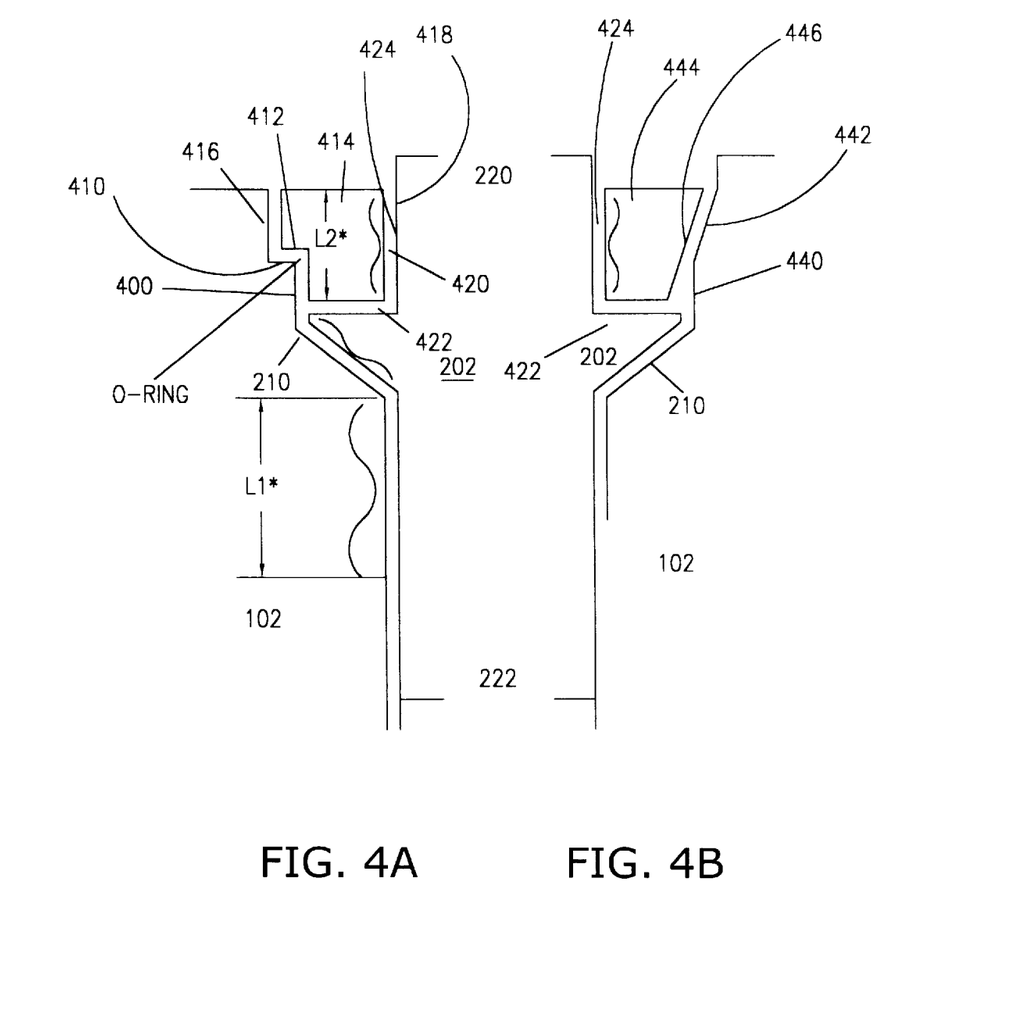
FIGS. 4A and 4B are vertical sectional views of a spindle motor incorporating the present invention including special features useful in assembly of the motor.

Thus, the present invention to be described with respect to FIGS. 3, 4A and 4B, provides the improvement of achieving a stiffer, more shock resistant design. Thus, in a motor which incorporates the present invention, both upper and lower ends of the shaft have journal bearings defined thereon, with a conical bearing/thrust bearing combination separating the journal bearings, so that the stiffness of the motor and its resistance to shock as well as its alignment to the rest of the system is enhanced and maintained.

Referring now to FIGS. 3, 4A and 4B, the design of the shaft to be used in the present invention and its relationship to the surrounding rotating sleeve will be shown. It will be immediately apparent to a person of skill in the field who studies this disclosure and looks at the figures how this shaft shown in this figure could be incorporated into the cartridge shown in FIG. 2, previously described, replacing the shaft shown therein.

FIG. 3 is a cross-sectional view of a design for a hydrodynamic fluid bearing comprising a shaft 100 having a sleeve 102 which surrounds the shaft 100, the shaft and sleeve rotating relative to one another. A hydrodynamic fluid is found in the gap 104 between the inner walls of sleeve 102 and the outer walls of shaft 100. The fluid separates the rotating and fixed portions of the bearing and provides a bearing surface therebetween. In order to prevent any fluid from leaving the gap 104, a capillary seal 106 is formed at the base of the gap 104 just above where the shaft joins the base 97. This capillary seal 106 is formed by utilizing diverging walls; as shown, the walls 107 of the sleeve diverges from the facing wall 109 of the shaft, although the opposite could be utilized. In fact, any of a number of capillary seal designs could be used without departing from the spirit of the invention.

In order to provide for fluid maintenance and movement within and through gap 104, a reservoir or internal slot 110 is provided, preferably along the center line 112 of the shaft 100. By "reservoir" is meant a region or hole in the shaft where the fluid does not contribute to the baring function. This reservoir or slot provides a passageway for the bearing fluid so that it circulates through the bearing sections 2–8 and bores 116, 118 and gap 114 without creating residue fluid pressure against capillary seal 106. As shown by the paired arrows 122, 124, 126, the circulation is equally effective in either direction and then direction of flow is decided by the net pressure in that direction. Thus, one of the radial bores 116 connects to the bearing gap adjacent an end of the conical bearing 200 and one side 205 of the thrust bearing. In fact, in the embodiment shown the thrust bearing gap between walls 205, 207 extends directly into bore 116.

The grooves in the gap, which may be formed either on the exterior surface of the shaft or the interior surface of the rotating sleeve, will be considered in eight different sections, which have been numbered here 1–8. Generally speaking, the top and bottom gap section 8, 7 and 1, 2 comprise journal bearings defined by parallel axial walls 150, 152 and 154, 156 of the shaft 100 and sleeve 102 respectively. Bearings 2, 7 and 8 are generally symmetrical, i.e., they are not designed to generate a net flow or pressure in either direction. However, bearing section 1 is non-symmetrical i.e. the grooves are defined to create a net pressure away from seal 106 and the gap in which it is defined to lessen the likelihood that any fluid will escape from the gap.

A thrust bearing 202 defined by radial walls 204, 205 of the shaft and counter plates 206, 207 of the sleeve 102, is incorporated adjacent one journal bearing 7, 8. A conical bearing 200 is defined by acute angle walls 208, 210 adjacent the other journal bearing 1, 2. The thrust bearing sections 4, 6 typically have grooves which create no net pumping action. Also section 5 is typically left ungrooved; its use is typically as a reservoir, although grooves could be added to achieve specific performance goals. In fact, section 5 could be omitted entirely as shown schematically in FIGS. 4A and 4B.

Finally, in this embodiment a section 9 is also defined comprising a segment 160 of thrust plate 162 facing the end surface 114 of shaft 100 across a gap 162 which is a part of the hydrodynamic bearing gap 104. As can be seen, the reservoir 110 opens into this gap 162 to provide continuous circulation for the fluid in bearing gap 104. To enhance this circulation, either surface 160 or surface 114 will be grooved in accordance with known techniques.

The grooves along bearing sections 1–8 may be either herringbone, spiral, sinusoids, half-sins, or other forms as are needed to generate fluid pressure and maintenance of the fluid over the surfaces of the gap. The grooves on sections 2, 3, 4, 6, 7, 8 can be made slightly unbalanced to provide recirculation in the bearing (however, slight pressure imbalance may be created inside the bearing when it runs for many reasons depending on which direction rotation will be). By adopting this approach, the fluid flows through two circulation paths which have axial bore 116 in common. The upper loop 250 comprises gap 162, the upper section of center reservoir 110, bore 116, and the bearing gap sections 4, 5, 6 and 7. The lower loop includes the lower portion of center bore 110, axial bore 118, bearing gap sections 2, 3 and axial bore 116. The flow in the two loops can be in either direction as indicated by arrows 122, 126; however, it is evident that if the flow in the upper loop 250 is clockwise then the flow in the lower loop would be counterclockwise to avoid flow conflicts in axial bore 116. By adopting this approach, the fluid flows through two circulation paths, one in the direction of arrows 120, 122 through the bore 118, and the second being in the direction of the arrows 124, 126 through the bore 114, with both returning to the reservoir through the central bore 116 as indicated by the arrow 128. The groove 1 is not symmetric and is designed to create a net pumping toward the interior of the bearing. This makes the bearing self-sealing.

The orientation of the hydrodynamic fluid bearing system of FIG. 3 is important because it determines which elements carry the load. For example, in the embodiment shown, in the Figure as drawn, the thrust plate 6 is the primary load-bearing surface. The remaining sections especially help to maintain the balance and overall stiffness and damping of the system. The thrust plate 6 together with conical bearing 3 does the job of preloading in the axial direction In summary, the combination of the conical bearing generally indicated at section 3 and the thrust bearing generally indicated at section 6 provides both the necessary stiffness and rigidity to support a number of discs for rotation in a disc drive without tilt or wobble in the system.

Figure 5:
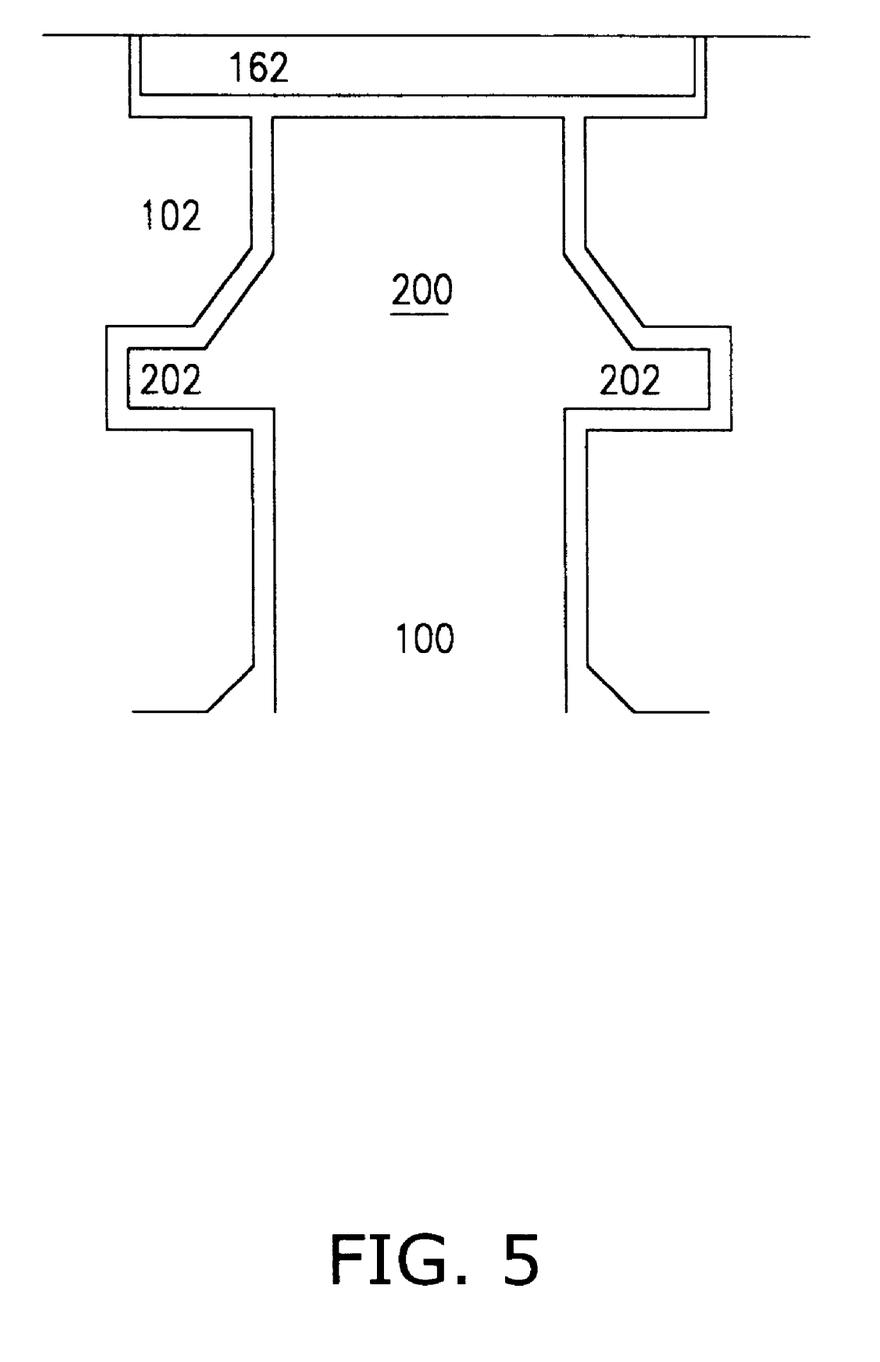
FIG. 5 shows a schematic of an alternative embodiment to the design of FIG. 3.

The system works equally well if the shaft and sleeve are inverted (see the simplified schematic of FIG. 5), so that the conical bearing 200 is now above the thrust bearing 202. In this instance, the primary load bearing surfaces become the conical bearing 200 generally indicated at 3. The same considerations apply, however, to the design of the overall system; and the gap routes 250, 252 maintain the stability and stiffness and damping of the system (although not shown in FIG. 5). It should be noted that when the system is inverted, the thrust plate 162 supported by the sleeve 102 will typically remain at the top of the bearing/motor.

Specific note should also be made of some of the relative dimensions of the journal bearings of the system. That is, the width D0 of the upper section 220 of the fixed shaft which defines the upper journal bearing can be greater than the width D1 of the section 222 of the shaft which forms the lower journal bearings. This allows for greater tolerances in the upper gap 224 which defines the upper journal, relative to the width of the gap 226 which forms the lower journal bearings. It should also be noted that the length L0 of the upper journal bearing 7, 8 from thrust bearing 202 to the end of the shaft is less than the length L1 of the lower journal bearing 1, 2 which extends from the end of the conical bearing 200 to the end of the shaft.

FIGS. 4A and 4B are partial sectional views illustrating alternative methods of assembly of the bearing of the present invention. Each of these assembly methods is especially useful in a design incorporating shorter, larger radius journal bearings 7, 8 defined by shaft segment 220 which has a less critical gap width than the longer, narrower journal bearing 1, 2, defined by shaft segment 222. Assume in this example that the top portion has a shorter, wider journal bearing; the sleeve 102 is held in place and the longer journal bearing is inserted therein. In this approach, the sleeve 102 in addition to having a tapered wall 210 to define one side of the gap of the conical bearing, ends in an axially extending wall 400, which ends in a step 410. A complementary notch 412 is provided in a block 414 which will fill the gap between the side wall 416 of sleeve 102 and the outer wall 418 of the upper journal bearing 220. The complementary step 410 and notch 412 will define the position of the block 414 so that the gap 210, 422, are set with reasonable accuracy.

Alternatively, the conical side wall of the sleeve 210 (FIG. 4B) may end in a relatively short vertical wall 440, which then tapers off into an angular wall section 442. The filler block 444, which will fill the space above the thrust bearing 202 and provides the complementary wall for the journal bearing, is then pressed into place, with the filler block having an outer angular wall 446 which made securely against the inner angular wall 442 of the sleeve. By providing these angular complementary walls, the filler block can accurately be seated in place, establishing the width of the gap 422 for the thrust bearing 202, the gaps 424, 210 for the upper journal bearing and conical bearing respectively.

Other features and advantages of the present invention may become apparent to a person of skill in the art who studies the present invention disclosure. It is already established that the present invention efficiently combines many advantages of both a conical bearing and a thrust bearing. The interface of the hydrodynamic bearings with the surrounding sleeve is extended over a greater area than in prior art designs, providing increased bearing stiffness and stability. The acute angled surface of the conical bearing also facilitates smooth operation, ease of assembly, and reduces the effects of differential thermal distortion. It should be noted that in this application a surface referred to as conical may be flat or slightly curved.

Forces on the hydrodynamic bearing will generally cause the cone to rotate within the cooperating portion, especially because the design provides extensions 220, 222 of the shaft defining journal bearings on either side of the thrust bearing and conical bearing combination. It will be apparent that this design is less likely to be damaged than prior art/thrust plate designs in which a small tilt of the drive shaft or surrounding sleeve could cause the tip contact between the thrust plate and the surrounding sleeve, or could cause the thrust plate to travel a relatively long distance.

As noted above, the above-described embodiment is a fixed shaft design; however, the design could as easily comprise a rotating shaft/fixed sleeve combination.

Other features and advantages of the present invention would be apparent to a person of skill in the art who studies the invention disclosure. Therefore, the scope of the present invention is to be limited only by the following claims.

What is claimed is:

1. A magnetic disc storage system comprising a base, a rotatable magetic storage disc having an axis of rotation;

a transducing head for reading and writing information on the disc;

a cover affixed to said base;

and a fluid dynamic bearing system comprising a fixed shaft having first and second ends said shaft cooperating with a rotating sleeve supporting the disc the sleeve rotating relative to said fixed shaft on an axis of rotation which coincides with a central axis of said shaft, the rotating sleeve cooperating with said fixed shaft to define, in order from said first to said second end, at least a first journal bearing, a first conical bearing, and a second journal bearing, said sleeve and said fixed shaft cooperating to establish a gap holding fluid to lubricate each of said above named bearings, and lubricating fluid in said gap separating said shaft and said sleeve to support rotation of said sleeve around said shaft.

2. A magnetic disc storage system as claimed in claim 1 including grooves on one of said surfaces of said shaft or said relatively rotating sleeve adjacent said first journal bearing, said grooves having a net pumping away from said capillary seal at said end of said journal, and toward said conical bearing, making the bearing self sealing.

3. A magnetic disc storage system as claimed in claim 1 wherein said shaft included in said second journal bearing has a greater diameter than the shaft included in said first journal bearing, said first journal bearing being directly adjacent said convex end of said conical bearing, whereby stability of said hydrodynamic fluid bearing system is enhanced.

4. A magnetic disc storage system as claimed in claim 1 wherein said conical bearing is defined by a convex surface of said shaft cooperating with a concave surface of said sleeve, a narrow end of said convex surface being closer to said base of the disc drive.

5. A magnetic disc storage system as claimed in claim 4 wherein said first and second journal bearings each include a portion of the gap between said fixed shaft and said relatively rotating sleeve, a first end of said gap adjacent said first journal bearing terminating in a capillary seal to prevent loss of said lubricating fluid from said gap, end of said gap terminates facing a counterplate mounted from said sleeve facing and end of said shaft, said second end of said gap being coupled to a gap between said counterplate and said end of said shaft to provide fluid circulation.

6. A magnetic disc storage system as claimed in claim 4 wherein a second end of said gap adjacent said first journal bearing terminating in a capillary seal to prevent loss of said lubricating fluid from said gap, end of said gap terminates facing a counterplate mounted from said sleeve facing and end of said shaft, said second end of said gap being coupled to a gap between said counterplate and said end of said shaft to provide fluid circulation.

7. A magnetic disc storage system as claimed in claim 6 wherein an axial length of said second journal bearing is less than an axial length of said first journal bearing.

8. A magnetic disc storage system as claimed in claim 7 wherein at least one surface defining said conical bearing is grooved.

9. A magnetic disc storage system as claimed in claim 8 wherein said thrust bearing includes first and second planar surfaces extending radially beyond said conical bearing, and joined by a vertical surface.

10. A magnetic disc storage system as claimed in claim 9 including a reservoir extending axially through said shaft and connected by one or more radial bores to said gap between said shaft and said sleeve.

11. A magnetic disc storage system as claimed in claim 10 wherein said reservoir extends to said gap between said shaft end and said counterplate.

12. A magnetic disc storage system as claimed in claim 11 wherein one of said radial bores connects to said gap adjacent said thrust bearing and said conical bearing.

13. A magnetic disc storage system as claimed in claim 11 wherein one of said radial bores connects to said gap adjacent said conical bearing.

14. A magnetic disc storage system as claimed in claim 11 wherein one of said radial bores connects to said gap adjacent said thrust bearing in such a manner that the radial bore radially extends the gap between the thrust plate and the counterplate.

15. A magnetic disc storage system as claimed in claim 11 wherein said fluid is a combination of gas and liquid or either gas or liquid alone can be used as a lubricant for the bearing.

16. A magnetic disc storage system comprising a housing for said disc drive, means for supporting one or more discs for constant speed rotation, and means for accessing data storage locations on each of said discs, said means for supporting comprising fluid-filled hydrodynamic bearing means comprising journal bearing means and conical bearing means cooperating with a fixed shaft for enabling a hub supporting said one or more discs to rotate relative to the shaft supported in said housing.

17. A disc drive comprising a disc, a motor, and bearing means connected to said disc and said motor, the bearing means comprising journal bearing means and conical bearing means for fluidically coupling said discs and said motor to a fixed shaft to achieve a constant rotational speed.

\* \* \* \* \*